United States Patent
He et al.

(10) Patent No.: US 6,657,677 B1
(45) Date of Patent: Dec. 2, 2003

(54) METHOD AND APPARATUS FOR IMPROVING CONVERSION FROM SD TO HDTV

(75) Inventors: Haiyan He, Ossining, NY (US); Johan Gerard Willem Maria Janssen, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 377 days.

(21) Appl. No.: 09/639,155

(22) Filed: Aug. 16, 2000

Related U.S. Application Data

(60) Provisional application No. 60/175,777, filed on Jan. 12, 2000, and provisional application No. 60/187,422, filed on Mar. 7, 2000.

(51) Int. Cl.$^7$ ................................................. H04N 5/21
(52) U.S. Cl. ...................... 348/625; 348/607; 348/627
(58) Field of Search ............................... 348/441, 446, 348/448, 625, 626, 627, 628, 631, 630, 607; H04N 1/20, 7/01, 5/21

(56) References Cited

U.S. PATENT DOCUMENTS

| | | | |
|---|---|---|---|
| 4,729,014 A | 3/1988 | Flamm et al. ................. 358/37 |
| 5,212,740 A | 5/1993 | Paek et al. .................... 382/22 |
| 5,218,649 A | 6/1993 | Kundu et al. .................. 382/54 |
| 5,666,164 A | 9/1997 | Kondo et al. ................. 348/164 |
| 5,712,687 A | 1/1998 | Naveen et al. ............... 348/453 |
| 5,852,470 A | 12/1998 | Kondo et al. ................. 348/448 |
| 5,920,356 A | 7/1999 | Gupta et al. ................. 348/606 |
| 5,940,141 A | * 8/1999 | Faroudja et al. ............. 348/628 |
| 6,005,983 A | 12/1999 | Anderson et al. ............ 348/43 |
| 6,008,862 A | * 12/1999 | Bellers ......................... 348/625 |
| 6,094,205 A | * 7/2000 | Jaspers ........................ 348/625 |
| 6,148,115 A | * 11/2000 | Mackinnon et al. .......... 382/266 |
| 6,229,578 B1 | * 5/2001 | Acharya et al. .............. 348/607 |
| 6,377,313 B1 | * 4/2002 | Yang et al. ................... 348/630 |

FOREIGN PATENT DOCUMENTS

| | | |
|---|---|---|
| EP | 0257129 A1 | 3/1988 |
| GB | 2322252 A | 8/1998 |
| JP | 57310 A | 1/1993 |
| JP | 09233489 A | 9/1997 |
| JP | 10063839 A | 3/1998 |

OTHER PUBLICATIONS

"Rational Unsharp Masking Technique", by G. Ramponi et al., Journal of Electronic Imaging.
"Edge Detection", by A.K. Jain, Fundmentals of Digital Image Processing.
"De–Interlacing– an Overview", by G. de Haan et al., Proceedings of the IEEE.
US 000057, U.S. Ser. No. 09/519,548, Filed Mar. 6, 2000.
US 000010, Method and Apparatus for Edge Detection, filed concurrently herewith.
US 000058, System and Method for Improving the Sharpness of a Video Image, filed concurrently herewith.

\* cited by examiner

*Primary Examiner*—John Miller
*Assistant Examiner*—Trang U. Tran
(74) *Attorney, Agent, or Firm*—Laurie E. Gathman

(57) ABSTRACT

Image enhancement is achieved by a combination of linear and non-linear techniques. The linear technique is preferably peaking, while the non-linear techniques is preferably LTI. The peaking is applied to non-edge areas of the image. The LTI is applied to edge areas of the image. LTI is of the sub-pixel variety. The image enhancement device is preferably part of a device for converting standard definition to high definition signals.

19 Claims, 10 Drawing Sheets

FIG. 12A  α=0.3 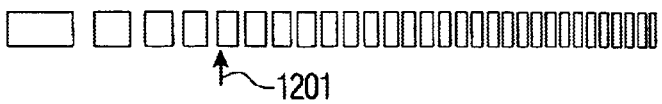
1201
FIG. 12B  α=0.5 
1202
FIG. 12C  α=1.0 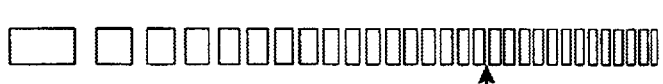
1203
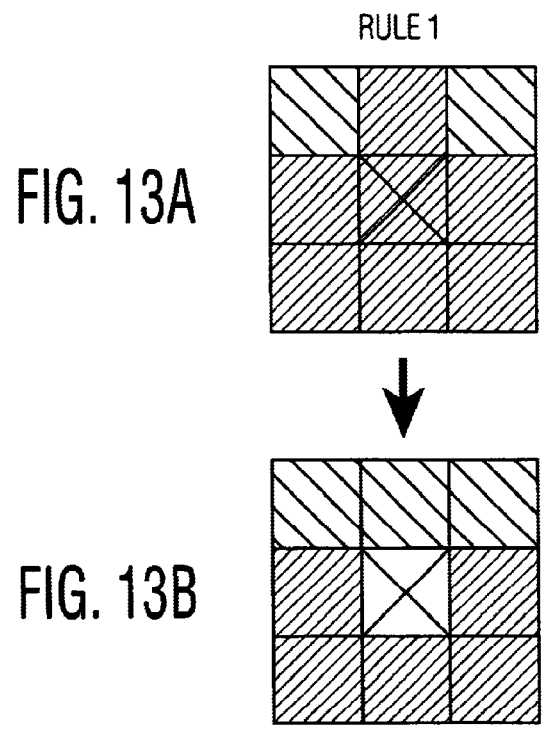
RULE 1
FIG. 13A
FIG. 13B

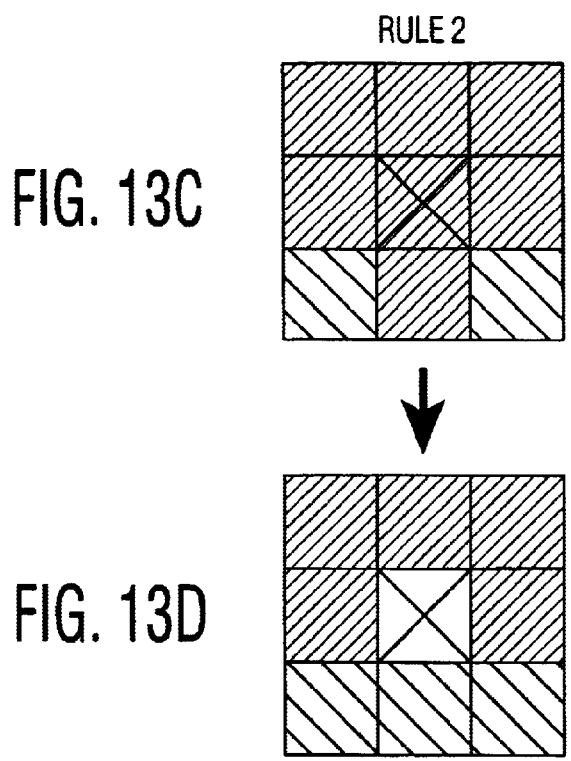
FIG. 13C
FIG. 13D
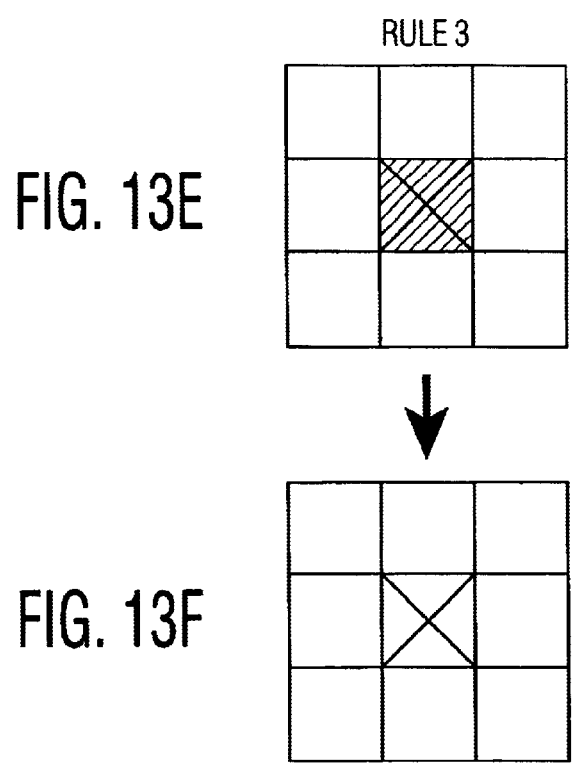
FIG. 13E
FIG. 13F

RULE 1
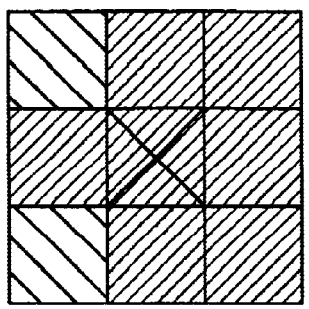
FIG. 14A
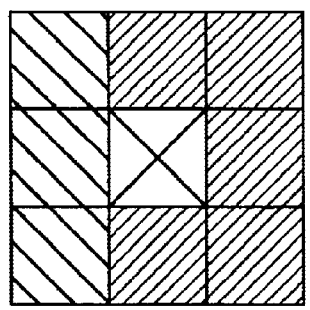
FIG. 14B
RULE 2
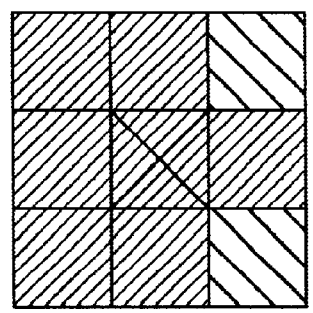
FIG. 14C
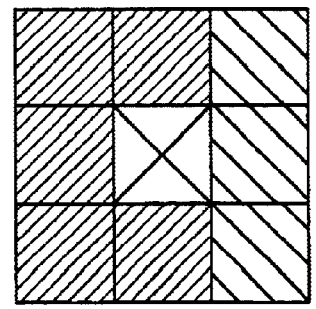
FIG. 14D

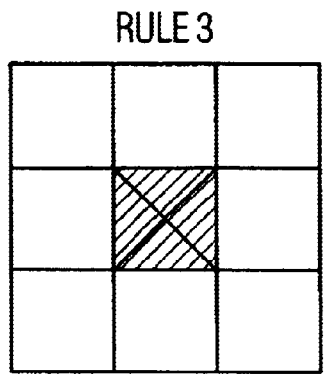
FIG. 14E
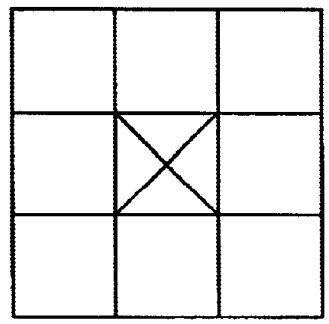
FIG. 14F

METHOD AND APPARATUS FOR IMPROVING CONVERSION FROM SD TO HDTV

RELATED APPLICATIONS

A related application, entitled METHOD AND APPARATUS FOR EDGE DETECTION, and having the same drawings and detailed description as the present application, is being filed concurrently herewith by the same inventors.

A second patent application by the same inventors as the present application and entitled "SYSTEM AND METHOD FOR IMPROVING THE SHARPNESS OF A VIDEO IMAGE" (ID 701025) is being filed concurrently herewith, and is incorporated herein by reference.

The present application claims benefit of provisional patent applications serial No. 60/175,777, filed Jan. 12, 2000, and No. 60/187,422, filed Mar. 7, 2000, which are both also incorporated herein by reference.

I. BACKGROUND OF THE INVENTION

A. Field of the Invention

The invention relates to the field of image enhancement.

B. Related Art

U.S. Pat. No. 5,666,164 shows an image enhancement technique for conversion from standard definition ("SD") to high definition television ("HDTV") signals.

II. SUMMARY OF THE INVENTION

It is an object of the invention to achieve further improvement with respect to image enhancement.

This object is achieved through a device that includes an edge detection unit, a non-linear enhancement unit for enhancing edges detected by the edge detection unit, and a linear enhancement device for enhancing non-edge areas identified by the edge detection unit.

Advantageously the linear device is a peaking unit. Also advantageously the non-linear device is an LTI unit.

Preferably the LTI unit is a sub-pixel level unit.

The device according to the invention can be used to improve SD to HDTV conversion.

Further objects and advantages will be apparent from the following.

III. BRIEF DESCRIPTION OF THE DRAWING

The invention will now be described by way of non-limiting example with reference to the following drawings.

FIG. 12 shows the effect of different values of THRESHOLD2.

FIGS. 13A–F and FIGS. 14A–F show rules for edge linking.

IV. DETAILED DESCRIPTION OF THE PREFERRED EMBODIMENTS

Figure 1:
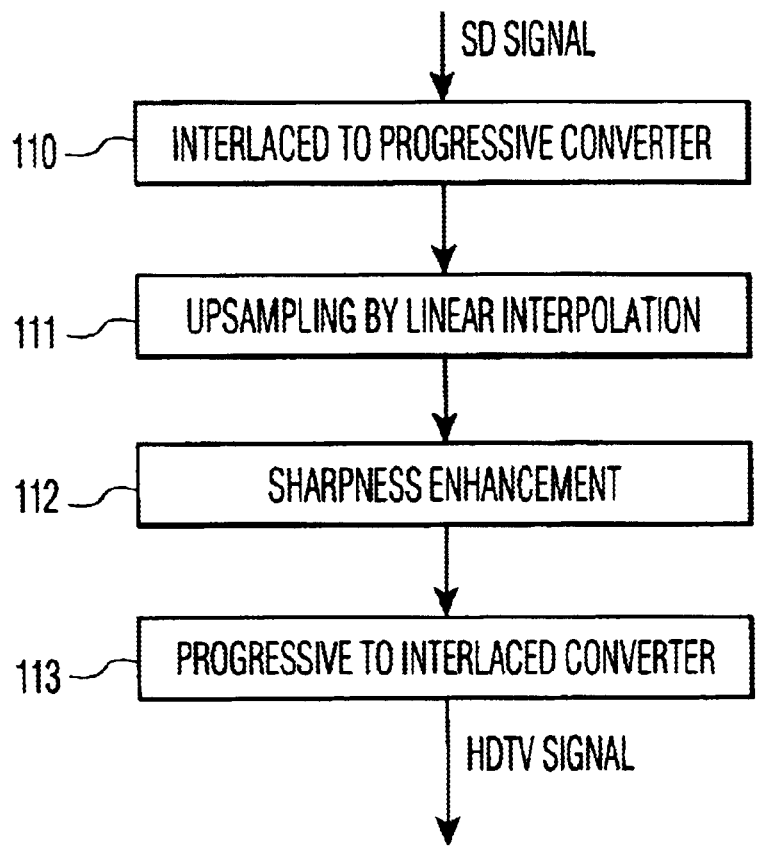
FIG. 1 shows an overview of a conversion unit for converting an SD signal to an HDTV signal.

FIG. 1 shows an overview of a device in accordance with the invention. An SD signal is fed to an interlaced to progressive converter 110. More information about interlaced to progressive converters can be found in G. De Haan and E. B. Bellers, "De-Interlacing—an overview", Proc. IEEE, vol. 86, pp. 1839–1857 (September 1998). At box 111, up-sampling is achieved by linear interpolation. Up-sampling can be performed separately for the horizontal and vertical directions prior to sharpness enhancement. The signal is then subjected to sharpness enhancement at box 112. Then a progressive to interlaced converter, which just takes every other line for each frame, turns the signal into an HDTV signal at 113. The boxes of FIG. 1 can be realized with hardwired circuits, or as code within a general purpose processor.

Figure 2:
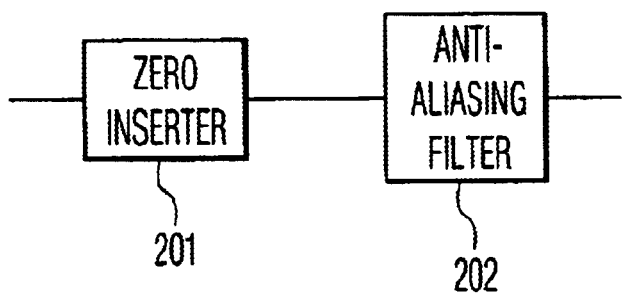
FIG. 2 shows more detail of the up-sampling unit.
Figure 3A:
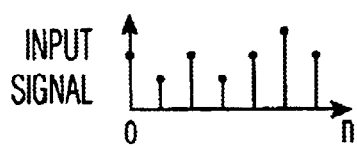
FIGS. 3 through 8 show operation of the linear interpolator.
Figure 3B:
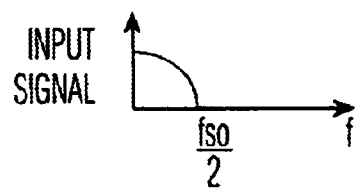

FIG. 2 shows more detail of the structure of box 111. Box 111 includes a conventional zero insertion unit 201 and a conventional anti-aliasing filter 102. The anti-aliasing filter preferably has the following coefficients:

$$\left[\frac{-3}{32}, 0, \frac{19}{32}, 1, \frac{19}{32}, 0, \frac{-3}{32}\right]$$

FIGS. 3 through 8 show the operation of the linear interpolator. FIG. 3a shows a time domain version of the input signal to the linear interpolator with samples 0 through n of different amplitudes. FIG. 3b shows a frequency domain version of the same input signal. The frequency domain version falls to zero at the value $f_{s0}/2$ where $f_{s0}$ is the original sampling frequency.

Figure 4A:
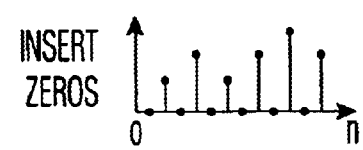
Figure 4B:
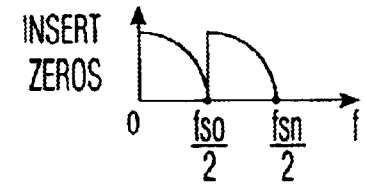

FIG. 4a shows the action of the zero inserter 201 in the time domain. FIG. 4b shows the result of the zero inserter in the frequency domain. The zero inserter causes the appearance of a second peak in the frequency domain, having a cutoff at $f_{sn}/2$, where $f_{sn}$ is the new sample frequency due to interpolation, in other words, the factor of upscaling in this example is two.

Figure 5:
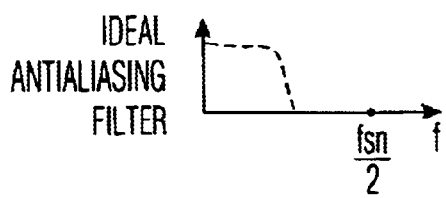

FIG. 5 shows the behavior of the ideal anti-aliasing filter in the frequency domain.

Figure 6A:
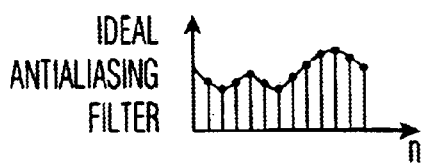
Figure 6B:
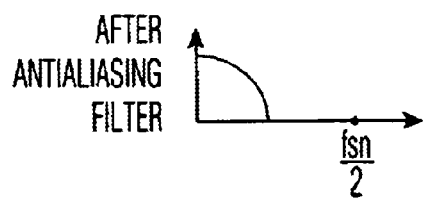

FIG. 6a shows, in the time domain, the result of the ideal anti-aliasing filter on the output of the zero inserter. FIG. 6b shows the same signal as FIG. 6a, except in the frequency domain.

Figure 7:
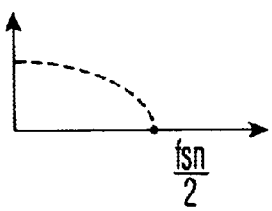

FIG. 7 shows the profile of a real anti-aliasing filter in the frequency domain.

Figure 8A:
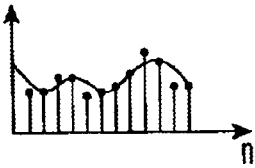
Figure 8B:
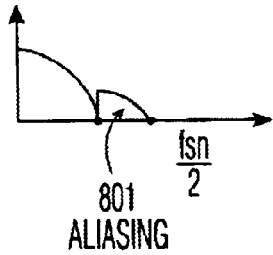

FIG. 8a shows, in the time domain, the result of a real anti-aliasing filter on the output of the zero inserter. FIG. 8b shows, in the frequency domain, the result of the real anti-aliasing filter. This curve shows aliasing at 801.

Figure 9:
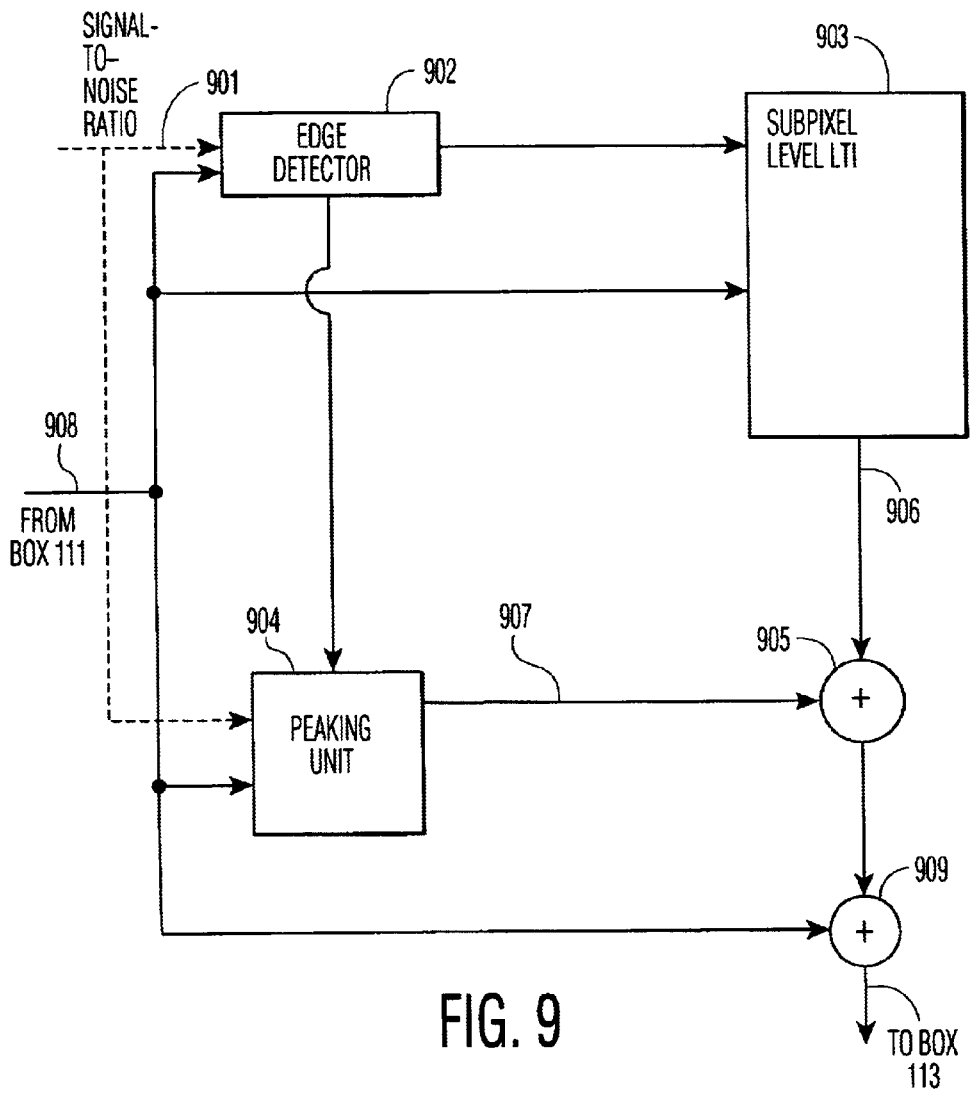
FIG. 9 shows a device for achieving sharpness enhancement.

FIG. 9 shows more detail of box 112. Input 901 comes from a signal-to-noise calculator. The preferred type of noise detection is disclosed in U.S. Pat. No. 6,359,658, entitled "Subjective Noise Measurement on Active Video Signal", incorporated herein by reference. Input 908 comes from box 111. Both the edge detector 902 and the peaking unit 904 use both inputs 908 and 901. The edge detector 902 will be further described below. The peaking unit 904 can be any conventional peaking unit, such as the one shown in European patent document EP 0257129. The peaking unit will be shut off if an edge is detected. The sub-pixel level Luminance Transient Improvement ("LTI") 903 takes inputs from both the edge detector 902 and box 111. The unit 903 is described in a patent application by the same inventors as the present application and entitled "System and Method for Improving the Sharpness of a Video Image" (ID 701025), filed concurrently herewith, and which is incorporated herein by reference. The outputs 906 and 907 are both in YUV 4:2:2 format. These outputs are then added by adder 905. The output signal from the adder 905 is added to the input signal 908 from box 111 by adder 909. The output of adder 909 goes to box 113 from FIG. 1. Signals on line 908 are in YUV 4:2:2 format.

Conceptually, the device of FIG. 9 combines a linear technique, i.e. peaking, with a non-linear technique, i.e. LTI, to improve interpolation results.

The peaking unit 904 enhances high frequency content by adding a high-passed signal to the original signal. Peaking has strengths and weaknesses as an image processing technique. After peaking, the amplitudes of the transients are increased; but the peaking process can easily be overdone, resulting in large rims about big transients. Moreover, peaking lacks robustness on noisy images. "Intelligent" control, required to avoid artifacts, may be attempted using a more complex peaking algorithm; however, the linear nature of peaking means that even with these more complex algorithms new frequencies cannot be introduced.

LTI shifts pixels towards the edge center. Edge detection decides which pixels need to be shifted using LTI. Therefore higher than normal frequencies are generated around the edge, and the slope of the transient is increased. LTI is robust in the presence of noise, when edge detection is reliable. Preferably edge detection is related to the signal-to-noise ratio of the input video signal. When edge detection is dependent on signal-to-noise ratio, then the control of the output will also be dependent on signal-to-noise ratio. Preferably, also, the subjective effect of LTI is not as strong as that of peaking, when the amplitude of a transient is small.

In the preferred embodiment, peaking and LTI are combined such that peaking works on small transients, while LTI works on large transients. In other words, for small transients, the amplitude is increased, whereas for large transients, the slope is increased. This technique makes a distinction between a soft edge, to which LTI will not be applied, and a sharper edge, to which LTI will be applied.

Generally, overflow/underflow problems that yield annoying artifacts only occur where there are large transients, i.e. on edges. Accordingly, underflow/overflow does not need to be prevented in the peaking unit, saving considerable circuitry or computing time there.

Though most of this disclosure is related to one dimensional image processing, effected in two passes, one horizontal and one vertical; 2D techniques may be used as well, for instance, 2D peaking may be used on texture parts of the image.

Figure 10:
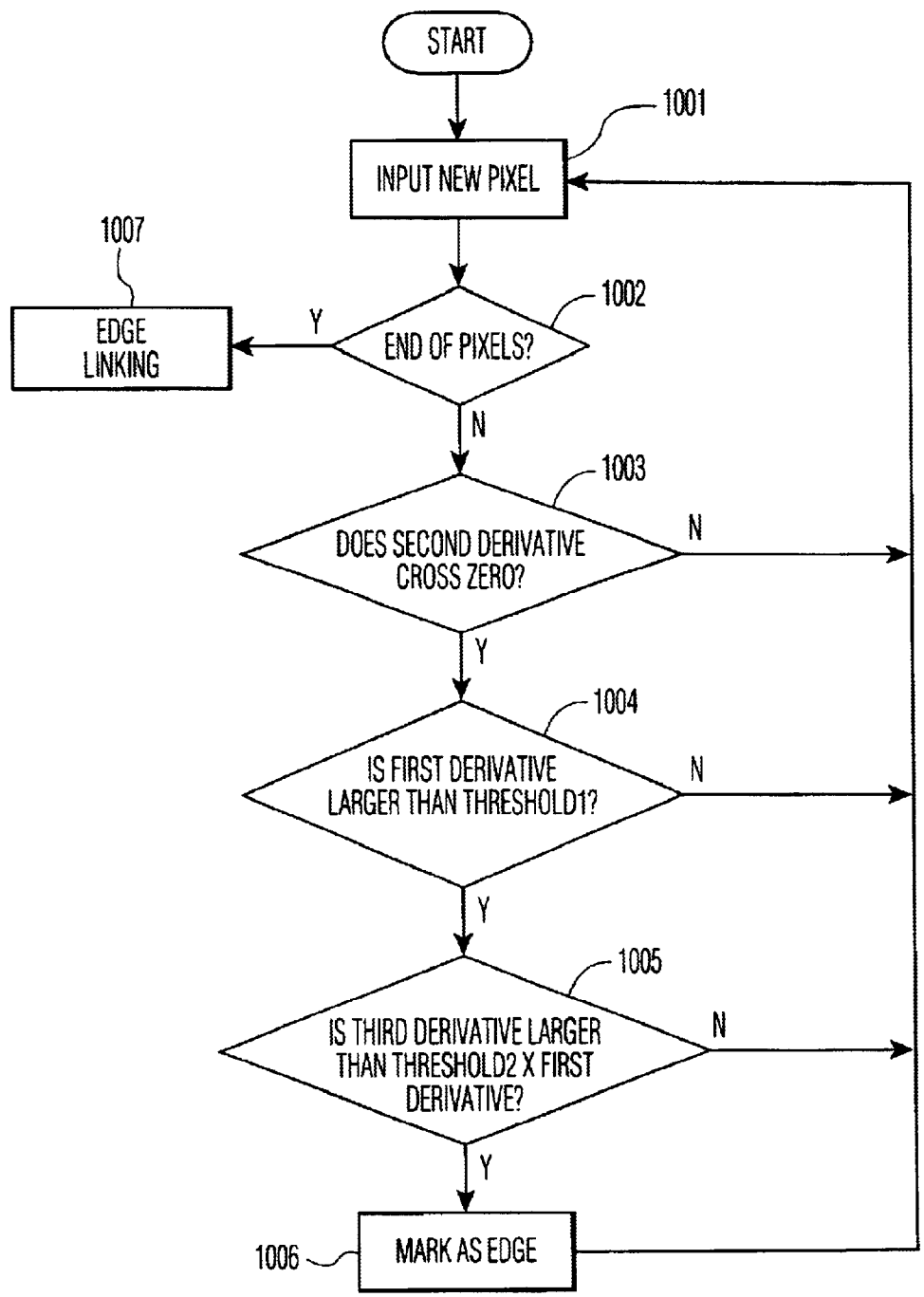
FIG. 10 is a flowchart relating to edge detection.

FIG. 10 illustrates flow of the preferred edge-detection procedure for use in box 902; however, other edge detectors may be designed by those of ordinary skill in the art for the purpose of input to the unit 903. The procedure of FIG. 10 may be performed in any type of processor, for instance, either by hard-wired hardware or by a programmed multi-purpose processor. For instance, boxes 1003–1005 may each be realized by an independent special purpose circuit.

In a two dimensional image, edge detection in accordance with FIG. 10 is preferably performed in each dimension separately. In other words, the flow chart of FIG. 10 is performed twice. This is preferred for two reasons. First, the eye is typically more sensitive to lines and edges in horizontal and vertical directions. Second, a diagonal edge appears as an edge in both horizontal and vertical directions.

The dimensions may be scanned in either order, vertical first or horizontal first. During the vertical scan, only horizontal edges will be detected and marked as edges. During the horizontal scan, only the vertical edges will be detected and marked as edges.

Box 1001 shows a request for input of a new pixel. At box 1002, a test is performed to see if the last pixel has been passed. If so, an edge linking procedure 1007 is begun. If not, at 1003, it is tested whether a low-pass second derivative crosses zero. If the result of the test of box 1003 is positive, an edge has been detected on the pixel level and control passes to 1004. If not, control passes to box 1001.

At 1004, it is determined whether a low-pass first derivative is larger than a value referred to as "Threshold1". Where the maximum value of the derivative is 255, the preferred value for Threshold1 is 20, though those of ordinary skill in the art may use other values in order to achieve various desired effects. If the test of box 1004 is not met, this is a false edge caused by noise, in which case, control returns to 1001. If the test is met, the possibility of a false edge has been eliminated and control passes to box 1005.

At 1005, it is tested whether a low-pass third derivative is larger than the product of a value referred to as "THRESHOLD2" and the low-pass first derivative. The preferred value for THRESHOLD2 is 0.45, though again those of ordinary skill in the art may use other values in order to achieve other desired effects. In general, changing the values of THRESHOLD1 and THRESHOLD2 will determine whether the picture is sharper or fuzzier. If the two thresholds are low, in general, it makes the image sharper. Which is desired may be a matter of personal taste. If the test of box 1005 is not met, the putative edge is too soft to apply LTI to, and control is returned to box 1001. If so, the pixel is marked as an edge at 1006.

Determining Whether the Low-pass Second Derivative Crosses Zero

The operations to be performed in box 1003 will now be described. A low-pass second derivative can be defined according to the following equation:

$$SD(n) \stackrel{\Delta}{=} L(n-m) - 2 \times L(n) + L(n+m) \qquad (1)$$

Where n is an integer variable denoting a present pixel m is an integer variable related to the up-scaling factor. For an upscale factor of 2, the typical value of m will be four, but those of ordinary skill in the art may derive other values depending on what works best experimentally L(n) is the luminance value at pixel n SD(n) is the low-pass second derivative at pixel n $\stackrel{\Delta}{=}$ means "is defined as"

The Laplace operator can be defined as follows:

$$S(n) \stackrel{\Delta}{=} L(n-1) - 2 \times L(n) + L(n+1) \qquad (2)$$

where the function S(n) represents the Laplace transform of pixel n. More about the Laplace operator can be found in U.S. Pat. No. 5,852,470, especially in FIGS. 14A–E and the accompanying text, which patent is incorporated herein by reference.

The low-pass second derivative is preferred in order to eliminate the effects of aliasing, as shown in FIG. 8b. The low-pass second derivative according to the preferred embodiment uses the vector [−1, 0, 0, 0, 2, 0, 0, 0, −1], in contrast with the vector [−1, 2, −1] that is more commonly used for a second derivative, i.e. Laplace operator. This preferred vector can be derived by convolution of a low pass filter, [1, 2, 3, 4, 3, 2, 1] with the traditional Laplace operator.

Figure 11:
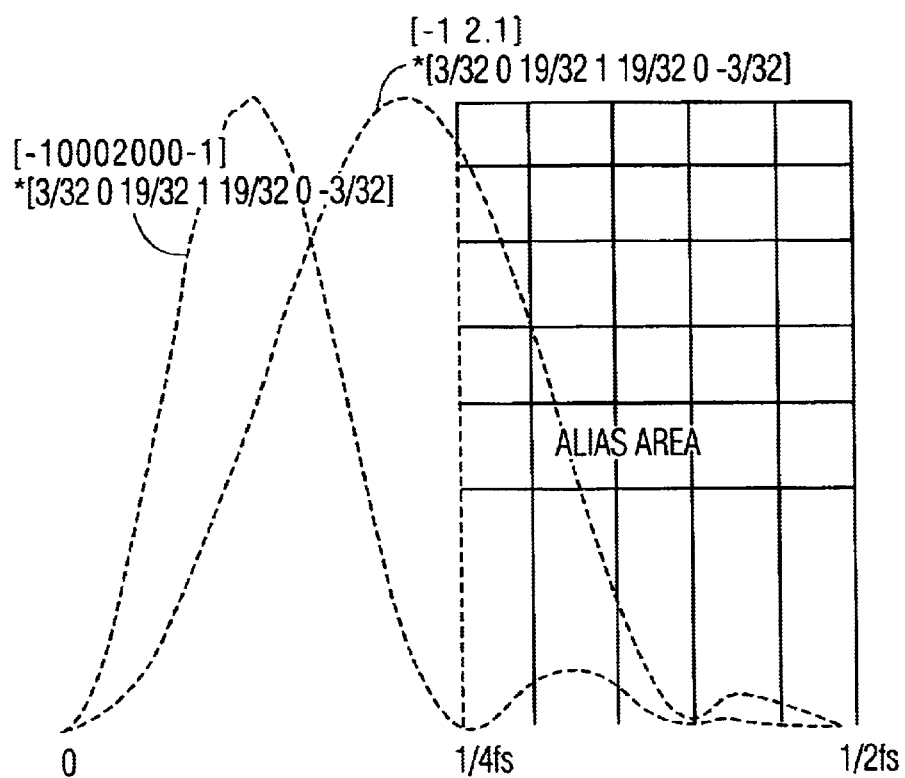
FIG. 11 shows the difference between the effects of standard and low pass Laplace operators.

FIG. 11 shows the frequency spectrum of the traditional Laplace operator and the low-pass second derivative, when combined with the anti-aliasing filter, in the frequency domain. The low-pass second derivative yields the lower frequency curve.

Therefore, the low-pass second derivative can also be calculated in accordance with the following equation:

$$SD(n) = [1, 2, \ldots, m, \ldots, 2, 1] \circledast S(n) \qquad (3)$$

Where $[1, 2, \ldots, m, \ldots, 2, 1]$ is the impulse response of a low pass filter. Equation (3) is thus equivalent to equation (1).

The advantage of using the low-pass second derivative, as compared with the Laplace operator alone, is increased robustness in the face of noise and aliasing. Zero crossing is preferably determined where $$SD(n) \cdot SD(n-1) < 0 \qquad (4)$$

This zero crossing calculation identifies candidate edge pixels.

Determining Whether the Low-pass First Derivative is Larger than THRESHOLD1

The operations to be performed within box 1004 will now be described.

The low-pass first derivative is preferably determined in accordance with the following equation:

$$FD(n) \triangleq L(n-m) - L(n) \qquad (5)$$

where the function FD(n) represents the low-pass first derivative at pixel n.

The gradient operator can be calculated as follows:

$$F(n) \triangleq L(n-1) - L(n) \qquad (6)$$

Then, analogously with the previous calculation for the low-pass second derivative, the low-pass first derivative can be calculated as follows:

$$FD(n) = [1, 1, 1, \ldots, 1] \circledast F(n) \qquad (7)$$

where $[1, 1, 1, \ldots, 1]$ is an m-bit vector and is the impulse response of a low-pass filter. Thus both the low-pass first derivative and the low-pass second derivative are based on a low pass version of standard operators. The vector in each case is chosen to simplify the coefficients resulting after convolution. Those of ordinary skill in the art may devise other vectors to achieve a low pass effect for these derivatives.

If $$|FD(n)| > THRESHOLD1 \qquad (8)$$

then the candidate pixel is retained. This calculation helps distinguish noise from actual edges.

Determining Whether the Low-pass Third Derivative is Larger than THRESHOLD2 Multiplied by the Low-pass First Derivative The operations within box 1005 will now be described. This box effects what will by referred to herein as an "edge frequency calculation". This calculation determines the slope of the edge. In video signals, some edges have steep slopes, while some edges have more gradual slopes. Generally, one does not want to sharpen the edges that have more gradual slope. These edges may have been deliberately softened, for instance to give a face a soft or smooth look. The soft edges will generally have a lower frequency content. Accordingly, edges with a higher frequency content should be sharpened.

Since it is difficult to locate the start or end of an edge, it is not accurate to calculate the edge slope from the first derivative alone. Accordingly, it is proposed to use the ratio between the low-pass third derivative and the low-pass first derivative as an indication of edge frequency.

The low-pass third derivative can be calculated from the low-pass second derivative in accordance with the following equation:

$$TD(n) \triangleq SD(n) - SD(n-1) \qquad (9)$$

where the function TD(n) is the low-pass third derivative at pixel n. Since a low-pass second derivative is used, TD will be a low-pass third derivative.

The following calculation may performed:

$$\frac{TD(n)}{FD(n)} > THESHOLD2 \qquad (10)$$

If the condition is true, then the edge frequency is high, so the edge becomes a candidate for sharpness enhancement. Since division is fairly expensive, from an implementation point of view, the calculation of equation 10 is preferably expressed as a test of whether the low-pass third derivative is greater than the product of the low-pass first derivative and THRESHOLD2. This product calculation is fully equivalent to performing the ratio calculation of equation (10). Accordingly, herein, when it is stated that the ratio of the third to the first derivative is greater than a threshold, this will include the possibility that the third derivative is compared to the product of the threshold and the first derivative. When the term derivative is used herein without the term "low-pass", the intention is to include the low-pass version as a possible embodiment.

Let us call the ratio between the low-pass third and low-pass first derivative $\alpha$. FIGS. 12A–C show the effect on edge detection for different values of $\alpha$. FIG. 12A is for $\alpha=0.3$; FIG. 12B is for $\alpha=0.5$; and FIG. 12C is for $\alpha=1.0$. Each of these figures shows a pattern of increasing frequency. The small arrows 1201, 1202, 1203 below the figures show where edges begin to be detected. In each case, all edges at and to the right of the arrow are detected as edges, and values to the left are considered soft edges. LTI is not applied to the soft edges, only to the edges at or to the right of the arrow.

Edge Linking

FIGS. 13A–F and 14A–F illustrate the preferred edge linking rules for the vertical and horizontal scans, respectively. Those of ordinary skill in the art may also devise other types of edge linking techniques for use with the edge detection disclosed above.

The rules illustrated in the figures depart from the assumption that isolated pixels indicated as edges are probably not really edges. Edges typically extend over several pixels.

The rules are illustrated as considering a neighborhood of a present pixel. The present pixel is marked with an 'x' in each case. The neighborhood has been chosen to be 3×3, for simplicity, but those of ordinary skill in the art may use other size neighborhoods, to give better results. Those of ordinary skill in the art may design neighborhoods that are not square. The edge linking rules for neighborhoods of different sizes and shapes will be different from those illustrated here for the 3×3 case.

In the figures, the darkest shaded squares represent pixels that have been definitely established to be edges. The less darkly shaded squares represent pixels that are to be ignored with respect to the rule in question. The rules of FIGS. 13A–D and 14A–D relate to reconstruction of lines with breaks in them, while the rules of FIGS. 13E–F and 14E–F relate to elimination of false edges.

FIGS. 13A&B illustrate rule 1 for the vertical edge detection scan. FIG. 13A shows a situation where the upper left and upper right squares are known to be edges. In this situation, in accordance with FIG. 13B, the edge linker should mark the entire top row of pixels as an edge and the present pixel as not an edge.

FIGS. 13C&D illustrate rule 2 for the vertical edge detection scan. FIG. 13C, shows the inverted situation from FIG. 13A. Now the bottom left and bottom right pixels have been identified as edges. In this situation, in accordance with FIG. 13D, the edge linking module should mark the entire bottom row of pixels as an edge and the present pixel as not an edge.

FIGS. 13E&F illustrate rule 3 for the vertical edge detection scan. FIG. 13E illustrates a situation in which all of the pixels surrounding the present pixel are known not to be edges. In such a case, the edge linker marks the present pixel to be not an edge.

FIGS. 14 A&B illustrate rule 1 for the horizontal edge detection scan. This is a 90 degree rotation of the rules of 13A–D. In FIG. 14A, the top and bottom left pixels are marked as edges. FIG. 14B shows that as a result of edge linking, the entire left column of pixels is marked as an edge, while the present pixel is marked as not being an edge.

FIGS. 14 C&D illustrate rule 2 for the horizontal edge detection scan. In FIG. 14C, the top and bottom right pixels are marked as edges. FIG. 14D shows the resulting action of the edge linker. In FIG. 14D, the entire right column of pixels is marked as an edge and the center pixel is marked as not an edge.

FIGS. 14E&F show rule 3 for the horizontal scan. Rule 3 for the horizontal scan is the same as rule 3 for the vertical scan.

From reading the present disclosure, other modifications will be apparent to persons skilled in the art. Such modifications may involve other features that are already known in the design, manufacture and use of image enhancement techniques and which may be used instead of or in addition to features already described herein. Especially, where hardware embodiments are shown, software may be substituted; and, where software embodiments are shown, hardware may be substituted. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

What is claimed is:

1. A video image enhancement device comprising:
    an edge detection unit comprising:
        a first circuit capable of determining whether a pixel in a video image is a candidate edge pixel by calculating a low pass second derivative for said pixel and determining that said pixel is a candidate edge pixel when said low pass second derivative crosses zero;
        a second circuit capable of determining whether a candidate edge pixel identified by said first circuit is located in a false edge of said video image by calculating a low pass first derivative for said candidate edge pixel and determining that said candidate edge pixel is not located in said false edge by determining that said low pass first derivative is greater than a first threshold value; and
        a third circuit capable of performing an edge frequency calculation for said candidate edge pixel to determine a slope of an edge in which said candidate edge pixel is located, said third circuit performing said edge frequency calculation by calculating a low pass third derivative for said candidate edge pixel and determining whether said low pass third derivative for said candidate edge pixel is greater than the product of a second threshold value and a value of said low pass first derivative for said candidate edge pixel.

2. The device of claim 1, wherein said first circuit calculates said low pass second derivative from the equation:

$$SD(n)=L(n-m)-2\times L(n)+L(n+m)$$

where SD(n) represents said low pass second derivative, and where the letter n is an integer denoting said pixel, and where the letter m represents an integer variable that relates to an upscaling factor, and where L(n) is the luminance value at said pixel n.

3. The device of claim 2, wherein said low pass second derivative SD(n) comprises a vector that is equal to:

$$[-1, 0, 0, 0, 2, 0, 0, 0, -1].$$

4. The device of claim 1, wherein said first circuit calculates said low pass second derivative from the equation:

$$SD(n)=[1, 2, \ldots m, \ldots, 2,1]\hat{X}S(n)$$

where SD(n) represents said low pass second derivative, and where the letter n is an integer denoting said pixel, and where the letter m represents an integer variable that relates to an upscaling factor, and where S(n) represents a Laplace transform of pixel n, and where the symbol $\hat{X}$ represents the convolution function.

5. The device of claim 1, wherein said second circuit calculates said low pass first derivative from the equation:

$$FD(n)=L(n-m)-L(n)$$

where FD(n) represents said low pass first derivative, and where the letter n is an integer denoting said candidate edge pixel, and where the letter m represents an integer variable that relates to an upscaling factor, and where L(n) is the luminance value at said pixel n.

6. The device of claim 1, wherein said second circuit calculates said low pass first derivative from the equation:

$$FD(n)=[1, 1, 1, \ldots, 1]\hat{X}F(n)$$

where FD(n) represents said low pass first derivative, and where the letter n is an integer denoting said candidate edge pixel, and where [1, 1, 1, . . . , 1] is an m-bit vector that is an impulse response of a low pass filter, and where the symbol $\hat{X}$ represents the convolution function, and where F(n) represents a gradient operator given by the equation:

$$F(n)=L(n-1)-L(n)$$

where L(n) is the luminance value at said pixel n.

7. The device of claim 1, wherein said third circuit calculates said low pass third derivative from the equation:

$$TD(n)=SD(n)-SD(n-1)$$

where TD(n) represents said low pass third derivative at pixel n, and where SD(n) represents said low pass second derivative at pixel n, and where the letter n is an integer denoting said candidate edge pixel.

8. The device of claim 1, wherein said edge detection unit marks said candidate edge pixel as being located in an edge when said low pass third derivative of said candidate edge pixel is greater than said product of said second threshold value and said value of said low pass first derivative for said candidate edge pixel.

9. The device of claim 8 wherein said edge detection unit performs an edge linking process on said pixel that is marked as being located in said edge.

10. The device of claim 8 further comprising:
   a non-linear enhancement unit for enhancing edges detected by said edge detection unit; and
   a linear enhancement device for enhancing non-edge areas identified by said edge detection unit.

11. The device of claim 9 wherein said non-linear enhancement unit comprises an LTI unit that operates on a sub-pixel level and said linear enhancement device comprises a peaking unit.

12. A standard definition (SD) signal to high definition (HD) signal conversion apparatus comprising the video image enhancement device of claim 10.

13. The conversion apparatus of claim 12 further comprising:
   an interlaced to progressive converter;
   an up-sampling unit; and
   a progressive to interlaced converter.

14. A method for enhancing a video image comprising the steps of:
   providing a pixel of a video image to an edge detection unit of a video image enhancement device; and
   detecting in said edge detection unit whether said pixel of said video image is located within an edge of said video image, said step of detecting comprising the steps of:
      calculating in a first circuit of said edge detection unit a low pass second derivative for said pixel;
      determining whether said low pass second derivative crosses zero;
      identifying said pixel as a candidate edge pixel when said low pass second derivative crosses zero;
      determining whether a candidate edge pixel identified by said first circuit is located in a false edge of said video image,
      calculating in a second circuit a low pass first derivative for said candidate edge pixel;
      determining that said candidate edge pixel is not located in said false edge by determining that said low pass first derivative is greater than a first threshold value;
      performing in a third circuit an edge frequency calculation for said candidate edge pixel; and
      determining from said edge frequency calculation a slope of an edge of said video image in which said candidate edge pixel is located;
      wherein said step of performing said edge frequency calculation comprises the steps of:
         calculating a low pass third derivative for said candidate edge pixel; and
         determining whether said low pass third derivative for said candidate edge pixel is greater than the product of a second threshold value and a value of said low pass first derivative for said candidate edge pixel.

15. The method of claim 1 further comprising the steps of:
   marking said candidate edge pixel as being located in an edge when said low pass third derivative of said candidate edge pixel is greater than said product of said second threshold value and said value of said low pass first derivative for said candidate edge pixel; and
   performing an edge linking process on pixels that are marked as being located in an edge of said video image.

16. The method of claim 15 further comprising the steps of:
   non-linearly enhancing edges detected by said edge detection unit; and
   linearly enhancing non-edge areas identified by said edge detection unit.

17. The method of claim 16 further comprising the step of:
   enhancing with said video image enhancement device a standard definition (SD) signal that is converted to a high definition (HD) signal.

18. Computer-executable instructions stored on a computer-readable storage medium and capable of enhancing a video image, the computer-executable instructions comprising the steps of:
   providing a pixel of a video image to an edge detection unit of a video image enhancement device; and
   detecting in said edge detection unit whether said pixel of said video image is located within an edge of said video image, said step of detecting comprising the steps of:
      calculating in a first circuit of said edge detection unit a low pass second derivative for said pixel;
      determining whether said low pass second derivative crosses zero;
      identifying said pixel as a candidate edge pixel when said low pass second derivative crosses zero;
      determining whether a candidate edge pixel identified by said first circuit is located in a false edge of said video image;
      calculating in a second circuit a low pass first derivative for said candidate edge pixel; and
      determining that said candidate edge pixel is not located in said false edge by determining that said low pass first derivative is greater than a first threshold value; and
      performing in a third circuit an edge frequency calculation for said candidate edge pixel; and
      determining from said edge frequency calculation a slope of an edge of said video image in which said candidate edge pixel is located;
      wherein said step of performing said edge frequency calculation comprises the steps of:
         calculating a low pass third derivative fro said candidate edge pixel; and
         determining whether said low pass third derivative for said candidate edge pixel is greater that the product of a second thereshold value and a value of said low pass first derivative for said candidate edge pixel.

19. The computer-executable instructions stored on a computer-readable medium as set forth in claim 18 wherein said computer-executable instructions further comprise the steps of:
   marking said candidate edge pixel as being located in an edge of said video image when said low pass third derivative of said candidate edge pixel is greater than said product of said second threshold value and said value of said low pass first derivative for said candidate edge pixel; and
   performing an edge linking process on pixels that are marked as being located in an edge of said video image.

* * * * *